United States Patent
Martens et al.

(10) Patent No.: US 8,223,020 B2
(45) Date of Patent: Jul. 17, 2012

(54) METHOD AND DEVICE FOR SYNCHRONIZATION OF A DECODER OF A RFID RECEIVER

(75) Inventors: Olev Martens, Tallinn (EE); Alar Kuusik, Tallinn (EE); Aivar Liimets, Tallinn (EE)

(73) Assignees: Tallinn University of Technology, Tallinn (EE); OU Eliko Tehnoloogia Arenduskeskus, Tallinn (EE)

( * ) Notice: Subject to any disclaimer, the term of this patent is extended or adjusted under 35 U.S.C. 154(b) by 420 days.

(21) Appl. No.: 12/524,191

(22) PCT Filed: Jan. 23, 2008

(86) PCT No.: PCT/EE2008/000001
§ 371 (c)(1),
(2), (4) Date: Jul. 23, 2009

(87) PCT Pub. No.: WO2008/089779
PCT Pub. Date: Jul. 31, 2008

(65) Prior Publication Data
US 2010/0026496 A1    Feb. 4, 2010

(30) Foreign Application Priority Data
Jan. 23, 2007   (EE) .................................. 200700005

(51) Int. Cl.
*G08B 13/14* (2006.01)

(52) U.S. Cl. ................ 340/572.1; 340/572.2; 340/572.4

(58) Field of Classification Search ............... 340/572.1, 340/572.2, 572.4, 572.7, 505, 10.1
See application file for complete search history.

(56) References Cited

U.S. PATENT DOCUMENTS

| | | | |
|---|---|---|---|
| 6,501,807 B1 | 12/2002 | Chieu et al. | |
| 7,411,506 B2 * | 8/2008 | Volpi et al. | 340/572.4 |
| 2005/0269408 A1 | 12/2005 | Esterberg et al. | |
| 2006/0176980 A1 | 8/2006 | Lee | |
| 2007/0109129 A1 * | 5/2007 | Sundstrom et al. | 340/572.2 |

FOREIGN PATENT DOCUMENTS
WO    00/63830    10/2000

OTHER PUBLICATIONS
PCT Search Report dated May 19, 2008 of Patent Application No. PCT/EE2008/000001 filed Jan. 23, 2008.

* cited by examiner

*Primary Examiner* — John A Tweel, Jr.
(74) *Attorney, Agent, or Firm* — Maine Cernota & Rardin

(57) ABSTRACT

A method for synchronizing a RFID receiver, comprising receiving an input signal from a RFID tag, said input signal comprising a preamble section, creating a first reference waveform, comprising at least a fraction of said preamble section, calculating a first correlation value by correlating said input signal and said first reference waveform, creating a second reference signal so that there is virtually zero correlation between said first reference waveform and said second reference waveform, and using said first correlation value and said second correlation value for adjusting synchronization timebase, wherein the sign and the size of said second correlation value indicates the size and the sign of phase inaccuracy of the synchronization timebase.

10 Claims, 3 Drawing Sheets

METHOD AND DEVICE FOR SYNCHRONIZATION OF A DECODER OF A RFID RECEIVER

BACKGROUND OF THE INVENTION

1. Technical Field

The present invention relates to communication, more specifically to RFID (radio-frequency identification) systems, or similar, where decoding of bi-phase (for example FM0), Manchester or similar codes are needed. The main application field of the proposed invention are RFID-readers in RFID systems.

2. Background Art

RFID systems typically include RFID tags, and RFID readers (interrogators). Tags are mostly related to specific products or services, and are tracked by readers. Most often tags get power from the reader by radio frequency (RF) field, and respond to reader's commands by modulating the radiowaves. One problem at RFID signal decoding is large tolerance of the bit-frequencies (up to 10%), which makes it difficult to decode reliably real signals containing noise and disturbances.

U.S. Pat. No. 6,501,807 "Data recovery system for radio frequency identification interrogator" describes a system where decoding of the received data bits is carried out by counting of sequential oversampled samples of the same polarity. Such system is quite tolerant to timebase variations. General disadvantage of this system is to find precisely the beginning and ending of each data-bit and it will not allow reliable decoding of data bits at low signal-to-noise ratios being typical for real RFID systems, as power transmitted by readers is limited, and received signal is relatively weak. So, the working distance of readers is limited, or more power to be transmitted is needed, that can be impractical or not allowed by RF regulations.

US Patent Application US2005269408 "RFID joint acquisition of time sync and timebase" describes estimating the synchronization timebase not according to each data-bit individually, but according to longer time-period with multiple symbols, for example over a whole preamble (e.g., lasting for 16 data bits). Using longer time period gives smaller error in estimating of the synchronization timebase, as inaccuracies are spread over longer time interval. Also the influence of the noise is smaller over longer time interval. In this solution the best similarity (maximum correlation) of the ideal preamble and real signal is searched, by using a bank of parallel digital filters (also called correlation calculation units), designed for different timebases, and the best found timebase is further used. The problem of this solution is small accuracy and speed of finding of the correct timebase for synchronization, as the correlation is influenced by noise and disturbances in the real signal, and also as the correlation value around the maximum is relatively flat and therefore is not precise enough criterium for timebase correction for real signals. Inaccurate timebase does not allow correct decoding of the data from real signals.

Thus, there is a need for new improved method and device for synchronization of a decoder of RFID decoders.

DISCLOSURE OF THE INVENTION

The objective of the invention is to improve the synchronization speed and accuracy of the data-base for decoding of data bits, and so enabling to decode reliable decoding of the signals at lower signal-to-noise ratios, and so at increased distances or at smaller transmitted power. The objective is achieved by, in addition to finding a first correlation value by correlating the received input signal from the RFID tag with a first reference waveform (e.g., a preamble of the signal, a fragment of the preamble, or the preamble extended by following data bits), finding a second correlation value by correlating the input signal with a second reference waveform. The second reference waveform is selected so that there is virtually zero correlation between it and said first reference waveform. Therefore, for the exact synchronization, the second correlation value is very close to zero and the value and the sign of the second correlation value indicates the size and the sign of phase inaccuracy of the synchronization timebase. It allows to precisely and quickly (i.e., with small number of iterations) to achieve exact synchronization.

Calculation of the correlations can be thought as a digital finite impulse response (FIR) filtering of the input signal, against expected "matching masks". A full preamble or a fragment of it can be used in the synchronization process. Precise and quick synchronization allows reliable decoding of data bits also at low signal-to-noise ratios.

In the first stage of synchronization, when the synchronization inaccuracy (or synchronization error) is large, it could be reasonable to use only a fragment of the preamble for synchronization as then the second correlation value can be kept reasonably small. Further, if the synchronization error is decreasing, a full preamble could be used, to achieve more precise synchronization. Further, it could be reasonable to extend the preamble by decoded bits for further improving the synchronization accuracy, and deriving according first and second reference waveforms from it, to calculate said first and second correlation values.

Precise synchronization can be accomplished by re-sampling of the first and second reference waveforms, by adjusting the starting point of the first and second reference waveform, and the sampling period, calculated from the first and second correlation waveforms. One-pass or iterative calculations of the correction parameters can be used.

BRIEF DESCRIPTION OF THE DRAWINGS

The essence of the invention is described in details by following drawings.

MODES FOR CARRYING OUT THE INVENTION

One embodiment of the invention contains two means for calculation of the correlation of the input signal, relatively to first and second reference waveforms, and, if the first correlation value is large enough, the second correlation value is used for further adjusting the synchronization of the timebase.

Figure 1:
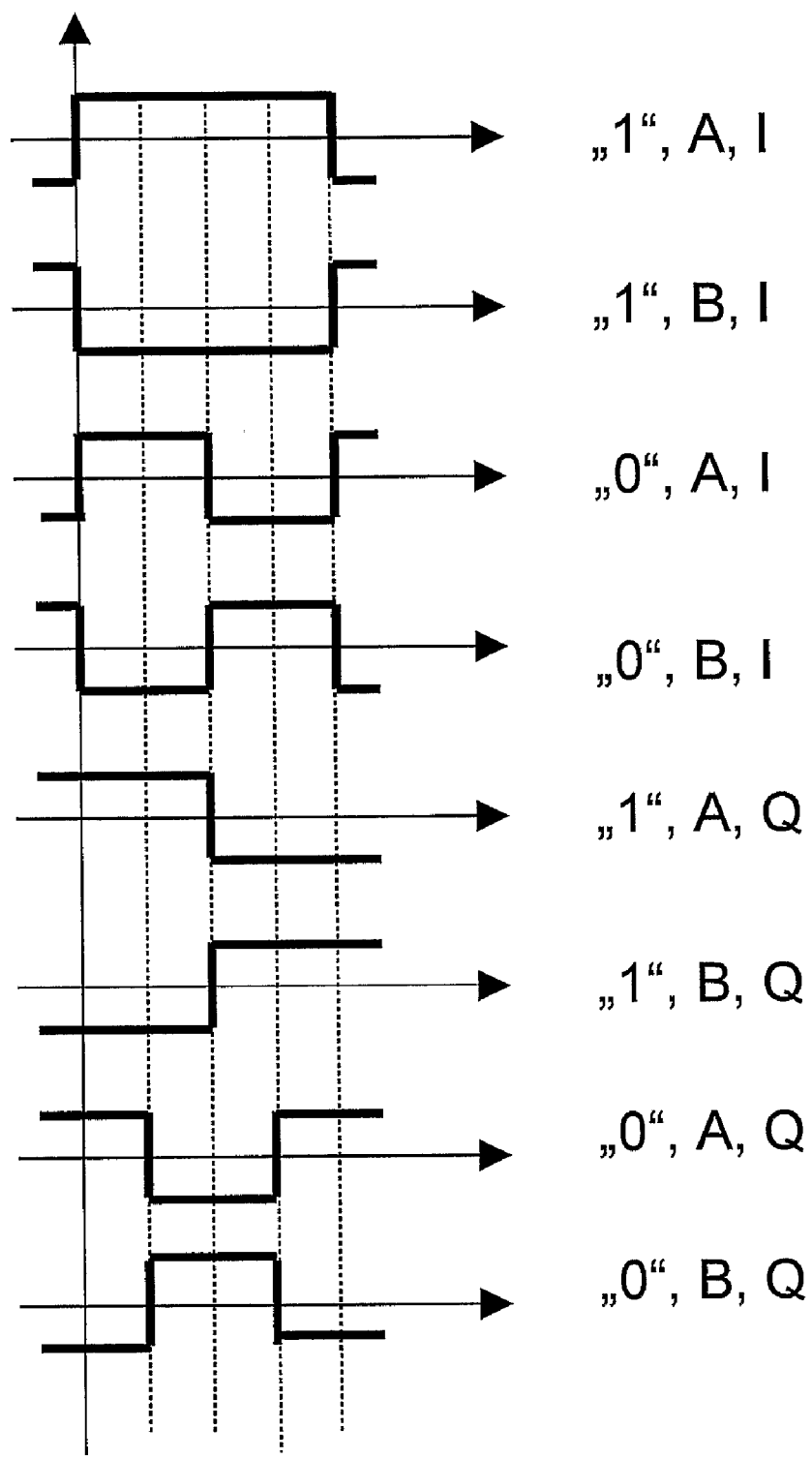
FIG. 1 is describing waveforms in the time domain of the first and second reference signals, for different bit-values and for different initial signal polarities, for length of one bit (symbol).

FIG. 1 depicts a first reference waveform and a second reference waveform, marked as "I" and "Q", respectively, for different data-bit ("0" and "1") and for two initial polarity values ("A" and "B"). So, to a waveform fragment "1", A, I of first reference signal corresponds a waveform fragment "1", A, Q of the second reference signal, and to a waveform fragment "1", B, I of the first reference signal corresponds a waveform fragment "1", B, Q of the second reference signal, etc.

The first reference waveform "I" corresponds to a transmitted bit (symbol) and for ideal case (with no noise and disturbances), exact synchronization is achieved at the maximum correlation of first reference waveform and the signal. The second reference waveform ("Q") is constructed from corresponding ideal bit (symbol) waveform to give a close to zero correlation signal (zero for ideal case) with corresponding "I" waveform (and so close to zero correlation value with the corresponding fragment of the real signal), and so—that second correlation value (between a corresponding bit (symbol) shape and second ("Q") reference signal) is indicating the size and sign of the phase error of timebase synchronization, thus allowing precisely and quickly correct the synchronization timebase. So, each fragment of the second reference value is constructed from the corresponding fragment of the first reference value so that for each fragment (with the length of single bit or several symbols) corresponding first and second reference signals has zero correlation, and for small time-shift of the said fragment of the first reference waveform (relatively to second reference waveform) to left gives change of the correlation value in one direction (for example, to more positive value), and to right—in another direction (for example, to more negative value).

Figure 2:
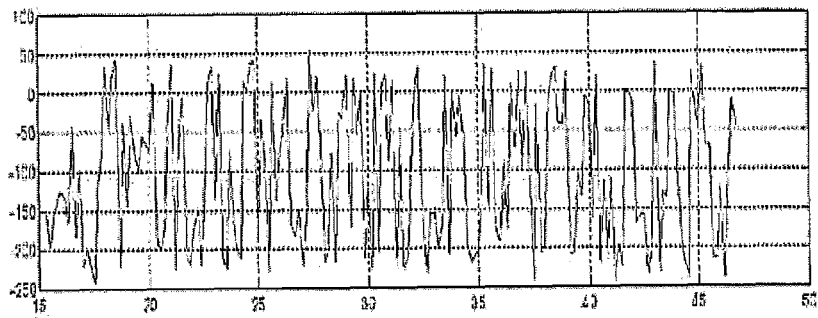
FIG. 2 is showing an example of the real (noisy) signal in the time domain, with preamble and some data bits.
Figure 3:
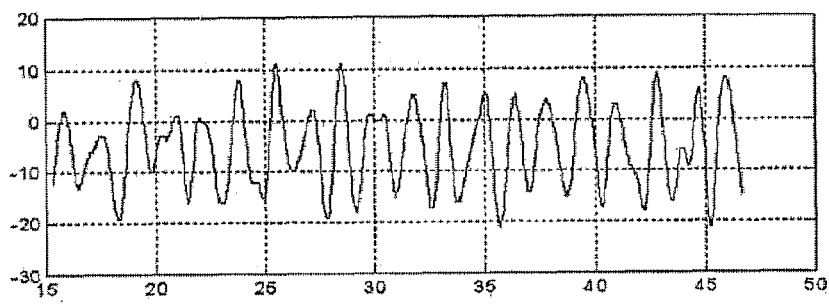
FIG. 3 is presenting re-sampled and band-pass-filtered (optional filter, for example digital FIR-filter used in an example embodiment) input signal.
Figure 4:
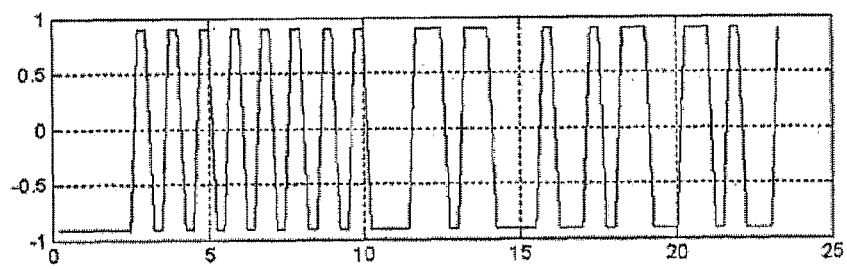
FIGS. 4 and 5 are presenting first and second reference signals, according to a preamble.
Figure 5:
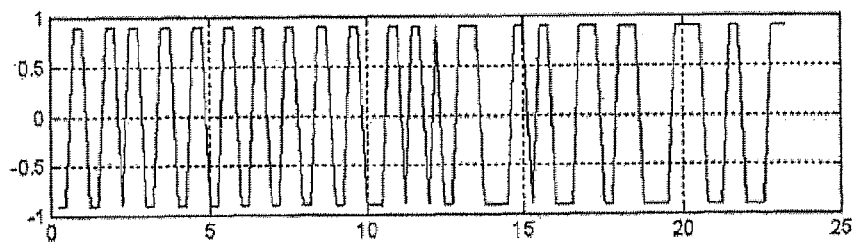

FIG. 2 to FIG. 5 are representing real-life signal waveforms. FIG. 2 is representing an input signal with noise. The input signal includes a preamble and some data bits. The signal must be synchronized before it can be decoded. To achieve timebase synchronization between input signal and the first and the second reference signals, the input signal is oversampled (and optionally digitally filtered, by using for example bandpass FIR-filter). The oversampled signal is shown in FIG. 3. The first reference signal "I" and second reference signal "Q", corresponding to preamble, are given on FIG. 4 and FIG. 5 correspondingly.

The initial value of synchronization timebase can be determined from the nominal bit-rate. First the preamble is approximately found from the input signal, by approximate correlation peak (maximum), as in known solutions.

The timebase can be further corrected by scanning the timebase values to find the minimum of the second correlation value (while checking the first correlation have to be large enough). Alternatively, the second correlation value divided by first correlation value is used as an estimation for proportional correction of the timebase, so allowing more frequent iterations of synchronization.

One alternative is to use the difference between first correlation value and absolute value of the second correlation value as indication of synchronization inaccuracy for searching for the best timebase synchronization. Such approach is efficient as first correlation maximum indicates approximate synchronization (but is relatively flat function), while second correlation (being more sharp function) has larger sensitivity to synchronization inaccuracy in near-precise-synchronization region, and thus, allows more precise synchronization. Here, it might be reasonable to use first and second correlation values with different weights.

As for large initial synchronization inaccuracy (and coming cumulative phase error) over relatively long preamble could be too large for normal functioning of such solution, it could be reasonable to use in initial stage only a fragment of the preamble (for example, a starting fragment), and later, while synchronization inaccuracy is decreases in the synchronization process, to use larger part of the fragment, up to whole length. Further more, it could be very reasonable to extend in the synchronization process the preamble by decoded bits, to use longer preamble for more precise synchronization.

Figure 6:
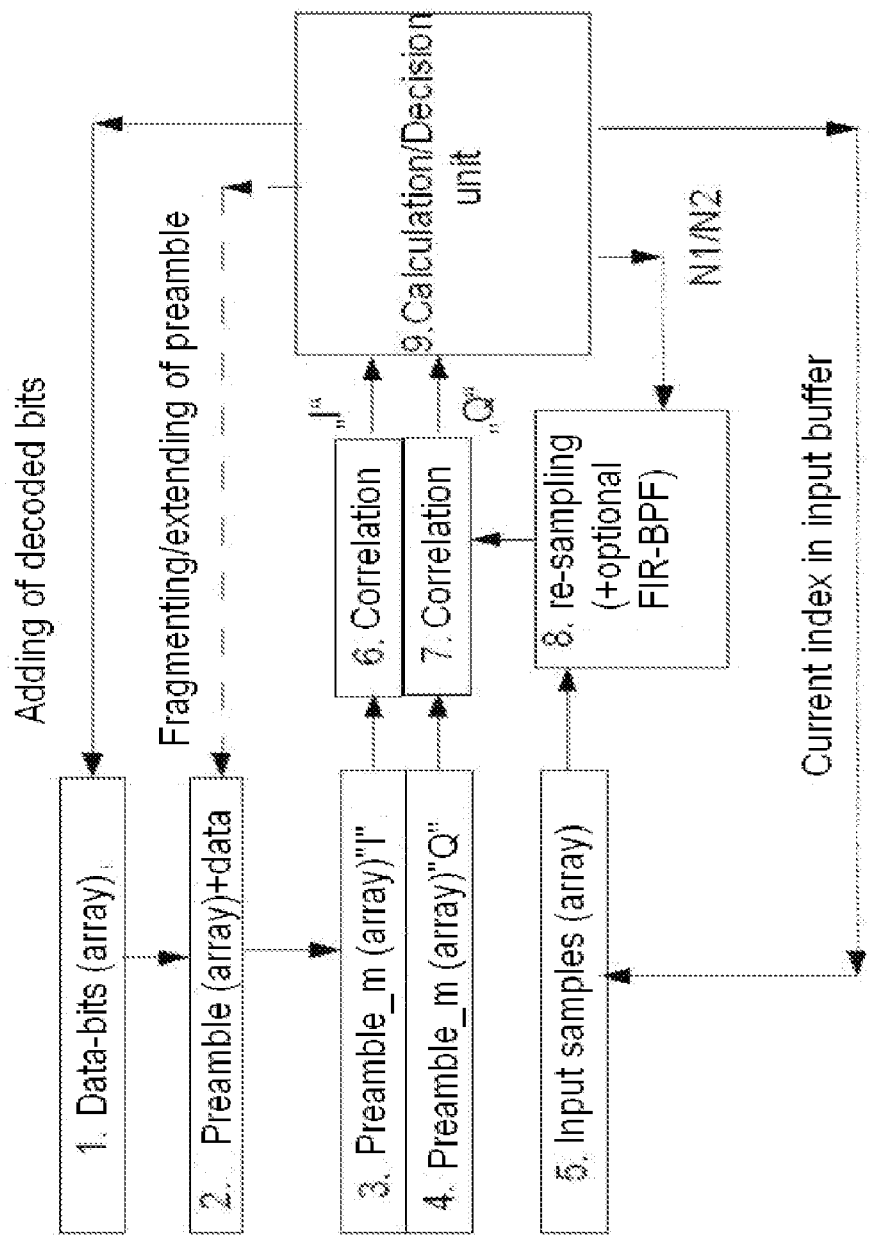
FIG. 6 is presenting a block diagram of one embodiment of the invention. The system contains means for holding of decoded data bits (1), means for holding of signal waveform, corresponding to the preamble (2), first and second means for holding of the first and second reference waveforms (3, 4), means for holding of the input signal(s) (5), means for calculating of the first and second correlations (6, 7), means for re-sampling and holding of the input signal (8), and calculation-decision-making unit (9).

FIG. 6 is representing a block-diagram of an embodiment of the invention. The device comprises means for holding of decoded data bits (1), means for holding of signal waveform, corresponding to the preamble (2), first and second means for holding of the first and second reference waveforms (3, 4), means for holding of the input signal(s) (5), means for calculating of the first and second correlations (6, 7), means for re-sampling and holding of the input signal (8), and calculation-decision-making unit (9).

The device operates as following. In the beginning, the array of data bits (hold in unit 1) is not initialized. The waveform of the known preamble (hold in unit 2) is initialized with length of it (for example with length of 16 data bits (symbols)). Also the first and second correlation waveforms (hold in units 3 and 4), derived from the preamble, are initialized. It is reasonable, that these reference signals in (3, 4) are held in oversampled (e.g., 4 times) forms, compared with original sampled input signal, and compared with preamble in unit 2.

Further first and second correlation values (calculated and hold in 6 and 7) of the input signal (from unit 5) against first and second reference waveforms (hold in 3 and 4, and derived from waveform from unit 2) are calculated. In the initial stage the nominal value of the bit-rate is used for initial selection of the timebase of the synchronization, or some other 'a priori knowledge of the tags to be read. Depending on the current value of the timebase frequency/period estimated in the synchronization process, the input signal is re-sampled in unit 8 (for example by over-sampling and zero-padding, and low-pass or band-pass digital filtering, so doing also interpolation of the input signal). Said filter have to pass the full and half frequencies of bit-rate (for example, for 40 kb/s RFID systems, and FM0 coding, the passband of filter could be 15-50 kHz).

Further the calculation-decision-making unit (9) is moving the pointer in the input signal sequence (in unit 5) until approximate correlation maximum in unit 5 (relatively to the first correlation signal hold in 3) is found. Then unit 9 holds further the estimated beginning of the preamble in the input signal (hold in 5). Then the second correlation (by using second reference of 4) is found, at the same pointer of the input signal (from 5). The second correlation waveform in (4) has been designed to give a zero value of the second correlation signal for precise synchronization, and indicating the phase-(timebase) polarity and size of the synchronization inaccuracy value. The second correlation value divided by first correlation value is directly used to estimate the needed correction for the timebase for synchronization.

An alternative could be also searching of the correct timebase value, if initial approximate starting of the preamble is found, by scanning of the re-sampling frequency value (in unit 8) in small, for example 0.01-0.1% steps, to find the best synchronization by minimum absolute value of second correlation (in 6).

Data bits could be decoded from the input signal, after re-sampling (and optional filtering), from unit 8, by selecting the possible bit-value symbol with the highest correlation against the reference signal of this possible bit. Waveforms of reference bit symbols are given on FIG. 1 (marked as "I").

One alternative is to fix the starting place of the preamble in the input signal once (by maximum of the first correlation), and in the synchronization process to adjust only the period (or frequency) of the timebase for synchronization.

Second alternative is to adjust also a starting place of the preamble in the (re-sampled) input signal in the synchronization process, by re-finding of the maximum of the first correlation. This can be done iteratively, in the range of the processed preamble, or every time the preamble is extended by next fragment or decoded data bits.

Although this invention is described with respect to a set of aspects and embodiments, modifications thereto will be apparent to those skilled in the art. The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The invention claimed is:

1. A method for synchronizing an RFID-reader, comprising receiving an input signal from a RFID tag, said input signal comprising a preamble section, creating a first reference waveform, comprising at least a fraction of said preamble section, calculating a first correlation value by correlating said input signal and said first reference waveform, creating a second reference signal so that there is virtually zero correlation between said first reference waveform and said second reference waveform, and finding a second correlation value by correlating said input signal and said second reference waveform, and using said first correlation value and said second correlation value for adjusting a synchronization timebase, wherein the sign and the size of said second correlation value indicates the size and the sign of phase inaccuracy of the synchronization timebase.

2. The method as in claim 1, comprising first determining approximate synchronization timebase by finding said first correlation value that is large enough compared to correlation peak value, and then adjusting the timebase by minimizing said second correlation value.

3. The method as in claim 1, comprising adjusting said timebase by finding the minimum of the absolute value of said second correlation value divided by said first correlation value.

4. The method as in claim 1, comprising adjusting said timebase by finding the maximum of difference of the first correlation value and corresponding absolute value of said second correlation value.

5. The method as in claim 1, comprising first determining said timebase, using a short fraction of said preamble section and further adjusting said timebase by longer fractions of said preamble section.

6. The method as in claim 1, comprising using an extended preamble, comprising said preamble section and extended by decoded data bits.

7. A device for synchronizing an RFID-reader, comprising
means for holding a raw input signal received from an RFID tag;
means for holding decoded data bits;
means for holding oversampled preamble and data bits, derived from said decoded data bits;
means for holding a first reference waveform and means for holding a second reference waveform;
means for calculating a first correlation value by correlating said first reference waveform and said input signal;
means for calculating a second correlation value by correlating said second reference waveform and said input signal;
means for resampling of said input signal and for holding said resampled signal; and
calculation-decision unit for decoding said data bits into said means for holding decoded data bits, for controlling said means for resampling of said input signal and for holding said resampled signal, keeping track of the processing point of said raw input signal and data length in means for holding oversampled preamble and data bits.

8. The method as in claim 2, comprising adjusting said timebase by finding the minimum of the absolute value of said second correlation value divided by said first correlation value.

9. The method as in claim 2, comprising adjusting said timebase by finding the maximum of difference of the first correlation value and corresponding absolute value of said second correlation value.

10. The method as in claim 3, comprising adjusting said timebase by finding the maximum of difference of the first correlation value and corresponding absolute value of said second correlation value.

\* \* \* \* \*